United States Patent
Omae et al.

(10) Patent No.: US 11,222,736 B2
(45) Date of Patent: Jan. 11, 2022

(54) WIRING HARNESS WITH A REINFORCING LAYER THAT INCLUDES POLYUREA RESIN

(71) Applicant: Sumitomo Wiring Systems, Ltd., Mie (JP)

(72) Inventors: Hikaru Omae, Mie (JP); Masashi Hayashi, Mie (JP)

(73) Assignee: Sumitomo Wiring Systems, Ltd.

( * ) Notice: Subject to any disclaimer, the term of this patent is extended or adjusted under 35 U.S.C. 154(b) by 0 days.

(21) Appl. No.: 16/629,605

(22) PCT Filed: Jun. 29, 2018

(86) PCT No.: PCT/JP2018/024859
§ 371 (c)(1),
(2) Date: Jan. 9, 2020

(87) PCT Pub. No.: WO2019/017185
PCT Pub. Date: Jan. 24, 2019

(65) Prior Publication Data
US 2021/0082600 A1     Mar. 18, 2021

(30) Foreign Application Priority Data

Jul. 19, 2017   (JP) .............................. JP2017-139705

(51) Int. Cl.
*H01B 7/24*     (2006.01)
*B60R 16/02*    (2006.01)
*H01B 7/00*     (2006.01)

(52) U.S. Cl.
CPC ........... *H01B 7/24* (2013.01); *B60R 16/0215* (2013.01); *H01B 7/0045* (2013.01)

(58) Field of Classification Search
None
See application file for complete search history.

(56) References Cited

U.S. PATENT DOCUMENTS 2,383,548 A * 8/1945 Hemming ................ H01B 7/29
524/46
2,408,416 A * 10/1946 Edgar .................... H01B 9/027
174/102 R (Continued)

FOREIGN PATENT DOCUMENTS

CN   1521058 A  *  8/2004 ......... B60R 16/0215
CN   108780679 A  * 11/2018 ............. B32B 5/026

(Continued)

OTHER PUBLICATIONS

Bonsmann. The Effect of Polyurea Mass Ratio on the Acceleration Mitigation Capabilities of Dynamically Loaded Structures. (Year: 2015).*

(Continued)

*Primary Examiner* — Timothy J. Dole
*Assistant Examiner* — Muhammed Azam
(74) *Attorney, Agent, or Firm* — Gerald E. Hespos; Michael J. Porco; Matthew T. Hespos

(57) ABSTRACT

A wiring harness (10) includes wires (20), an exterior material, such as a pipe (30), through which the wires (20) are inserted, and a reinforcing layer (40) formed to cover at least either the wires (20) or the exterior material. The reinforcing layer (40) is constituted by a resin film made of one or more materials selected from polyurea resin, polyurethane resin and mixed resin of the polyurea resin and the polyurethane resin.

8 Claims, 4 Drawing Sheets

(56) References Cited

U.S. PATENT DOCUMENTS

| | | | | |
|---|---|---|---|---|
| 2,933,550 A * | 4/1960 | Cole | H01B 7/0045 | 174/76 |
| 3,239,598 A * | 3/1966 | Olson | C08L 63/00 | 174/120 SR |
| 3,608,182 A * | 9/1971 | Donelan | H01B 7/24 | 228/173.4 |
| 4,241,119 A * | 12/1980 | Smart | B29C 61/06 | 428/34.9 |
| 5,367,126 A * | 11/1994 | Kikuchi | H01B 7/0045 | 174/135 |
| 6,092,854 A * | 7/2000 | Campbell | B60R 13/02 | 180/90 |
| 9,979,167 B1 * | 5/2018 | Volpone | H01B 7/0045 | |
| 2003/0198769 A1 | 10/2003 | Jing et al. | | |
| 2005/0011687 A1 * | 1/2005 | Yamaguchi | B60R 16/0215 | 180/65.1 |
| 2005/0162015 A1 * | 7/2005 | Yamaguchi | B60R 16/0215 | 307/10.1 |
| 2007/0074891 A1 * | 4/2007 | Burke | H01B 7/06 | 174/113 R |
| 2008/0206543 A1 * | 8/2008 | Whitaker | C04B 28/26 | 428/304.4 |
| 2008/0254679 A1 * | 10/2008 | Skarpil | B60R 16/0207 | 439/588 |
| 2010/0314148 A1 * | 12/2010 | Temblador | H02G 3/0468 | 174/24 |
| 2011/0120747 A1 * | 5/2011 | Muneyasu | B60R 16/0207 | 174/113 R |
| 2011/0127084 A1 * | 6/2011 | Ichikawa | B60R 16/0215 | 174/72 A |
| 2011/0133548 A1 * | 6/2011 | Toyama | B60R 16/0215 | 307/9.1 |
| 2011/0155458 A1 * | 6/2011 | Kato | C07C 227/04 | 174/74 R |
| 2013/0068497 A1 * | 3/2013 | Cinquemani | H01B 7/2813 | 174/105 R |
| 2013/0228367 A1 * | 9/2013 | Sato | B60R 16/0215 | 174/480 |
| 2013/0248246 A1 * | 9/2013 | Oga | B60R 16/0207 | 174/72 A |
| 2013/0277087 A1 * | 10/2013 | Hayakawa | H01B 3/50 | 174/107 |
| 2014/0076628 A1 * | 3/2014 | McGrath | H01B 7/0045 | 174/84 R |
| 2014/0144696 A1 * | 5/2014 | Nagahashi | H01B 9/022 | 174/70 R |
| 2014/0165392 A1 * | 6/2014 | Toyama | B60R 16/0215 | 29/825 |
| 2014/0182922 A1 * | 7/2014 | Imahori | H01B 7/0045 | 174/350 |
| 2014/0190741 A1 * | 7/2014 | Hayakawa | B60R 16/0215 | 174/72 A |
| 2014/0360771 A1 * | 12/2014 | Itani | H05K 9/0098 | 174/354 |
| 2015/0041210 A1 * | 2/2015 | Inao | B60R 16/0215 | 174/72 A |
| 2015/0068802 A1 * | 3/2015 | Kajiwara | H01B 13/01236 | 174/72 A |
| 2015/0114711 A1 * | 4/2015 | Dew | H02G 15/1806 | 174/72 A |
| 2015/0170796 A1 * | 6/2015 | Inao | B60R 16/0215 | 174/72 A |
| 2015/0246647 A1 * | 9/2015 | Sugino | B60R 16/0215 | 174/102 R |
| 2015/0274095 A1 * | 10/2015 | Inao | B60R 16/0215 | 174/72 A |
| 2015/0287497 A1 * | 10/2015 | Shiga | H01B 7/2825 | 174/84 R |
| 2015/0294764 A1 * | 10/2015 | Adachi | H01B 7/04 | 174/113 R |
| 2015/0294768 A1 * | 10/2015 | Sakaki | H01B 13/01209 | 174/68.3 |
| 2015/0364233 A1 * | 12/2015 | Asami | H02G 15/1813 | 29/869 |
| 2016/0134090 A1 * | 5/2016 | Kushima | H02G 3/0481 | 174/362 |
| 2016/0152196 A1 * | 6/2016 | Inao | H02G 3/04 | 174/72 A |
| 2016/0163416 A1 * | 6/2016 | Wakabayashi | H01B 7/0045 | 174/72 A |
| 2016/0164269 A1 * | 6/2016 | Inao | H02G 3/0468 | 174/68.3 |
| 2017/0103828 A1 | 4/2017 | Sugita et al. | | |
| 2017/0232913 A1 * | 8/2017 | Fukazu | B60R 16/0215 | 307/10.1 |
| 2017/0237379 A1 * | 8/2017 | Fukazu | B60L 15/32 | 318/503 |
| 2017/0256336 A1 * | 9/2017 | Takiguchi | H01B 7/282 | |
| 2017/0264062 A1 * | 9/2017 | Hayakawa | B60T 7/107 | |
| 2017/0338004 A1 * | 11/2017 | Yanazawa | H02G 3/0418 | |
| 2017/0365375 A1 * | 12/2017 | Holzmueller | H01B 7/282 | |
| 2018/0056897 A1 * | 3/2018 | Shimizu | H01B 9/02 | |
| 2018/0218807 A1 * | 8/2018 | Takahashi | B60R 16/0215 | |
| 2018/0268961 A1 * | 9/2018 | Kim | H01B 7/14 | |
| 2019/0013112 A1 * | 1/2019 | Jung | H05K 9/0098 | |
| 2019/0228885 A1 * | 7/2019 | Boecker | B29C 65/4835 | |
| 2021/0057128 A1 * | 2/2021 | Takata | H01B 7/0045 | |
| 2021/0291760 A1 * | 9/2021 | Sugihara | H02G 3/0468 | |

FOREIGN PATENT DOCUMENTS

| | | | | |
|---|---|---|---|---|
| CN | 110326061 A | * | 10/2019 | H01B 7/00 |
| CN | 109207098 B | * | 5/2021 | H01R 13/50 |
| GB | 2490008 A | * | 10/2012 | H02G 3/0691 |
| JP | 2004-224156 | | 8/2004 | |
| JP | 2007-287335 | | 11/2007 | |
| JP | 3144372 | | 8/2008 | |
| JP | 2013-143261 | | 7/2013 | |
| JP | 2014-150679 | | 8/2014 | |
| JP | 2015089925 A | * | 5/2015 | H01B 7/295 |
| JP | 2017-073282 | | 4/2017 | |
| JP | 2017-103931 | | 6/2017 | |
| WO | WO-2013118338 A1 | * | 8/2013 | B60R 16/0215 |
| WO | WO-2014125666 A1 | * | 8/2014 | H01B 7/285 |
| WO | WO-2014129011 A1 | * | 8/2014 | H01B 13/01263 |
| WO | WO-2016067891 A1 | * | 5/2016 | C09D 151/08 |
| WO | WO-2016174961 A1 | * | 11/2016 | H01B 7/00 |
| WO | WO-2017010283 A1 | * | 1/2017 | H01B 7/228 |
| WO | WO-2018056460 A1 | * | 3/2018 | H01B 7/0045 |
| WO | WO-2019017185 A1 | * | 1/2019 | H01B 7/1875 |

OTHER PUBLICATIONS

Yong Wang, .Recent Development of High Energy Density Polymers for Dielectric Capacitors. (Year: 2010).*
Casalini. Nanofiller reinforcement of elastomeric polyurea (Year: 2012).*
Tan. The search for enhanced dielectric strength of polymer based dielectrics (Year: 2020).*
Qiao. Dynamical mechanical and ultrasonic properties of polyurea (Year: 2011).*
Translation of ISR of 16629605. WIPO (Year: 2021).*
International Search Report dated Sep. 11, 2018.

* cited by examiner

WIRING HARNESS WITH A REINFORCING LAYER THAT INCLUDES POLYUREA RESIN

BACKGROUND

Field of the Invention

The invention relates to a wiring harness.

Related Art

Japanese Unexamined Patent Publication No. 2004-224156 discloses a wiring harness with a wire (high-voltage cable) and a metal pipe through which the wire is inserted. The metal pipe in this case functions to protect the wire from outside.

In the event of a vehicle collision, an excessive impact force acts on the metal pipe and, for example, a projection may pierce the metal pipe. To avoid this, a tubular protecting member that is excellent in impact resistance may be provided around the metal pipe.

The protecting member around the metal pipe to improve impact resistance increases an outer diameter by a thickness of the protecting member. Thus, there is a problem that space efficiency is deteriorated. Further, if water intrudes between the protecting member and the metal pipe, there is a concern about accelerated corrosion of the metal pipe. Thus, a water stopping structure may be required between the protecting member and the metal pipe, thereby increasing the assembly man-hours and cost.

The invention was completed on the basis of the above situation and aims to provide a wiring harness excellent in impact resistance and capable of reducing assembly man-hours and cost without significantly enlarging an outer diameter.

SUMMARY

The invention is directed to a wiring harness with a wire, an exterior material through which the wire is inserted, and a reinforcing layer formed to cover at least one of the wire or the exterior material. The reinforcing layer is constituted by a resin film made of one or more materials selected from polyurea resin, polyurethane resin and mixed resin of the polyurea resin and the polyurethane resin.

According to the invention, impact resistance can be ensured by the reinforcing layer formed to cover at least one of the wire or the exterior material. In this case, the reinforcing layer is constituted by the resin film made of one or more materials selected from the polyurea resin, the polyurethane resin and the mixed resin of the polyurea resin and the polyurethane resin. Thus, an outer diameter of the wiring harness need not be increased significantly. Further, if the reinforcing layer is a resin film, water hardly intrudes between the reinforcing layer and the exterior material and the corrosion of the exterior material can be prevented even if the exterior material is made of metal. In addition, since a waterproof structure is not newly provided, assembly man-hours and the number of components do not increase and cost can be suppressed.

The reinforcing layer may be coated on a part of an outer peripheral surface of the exterior material in a circumferential direction and a length direction. According to this configuration, the reinforcing layer can be formed selectively in a location where an impact is expected to be applied at the time of vehicle collision and the resin constituting the reinforcing layer need not be consumed wastefully.

The reinforcing layer may be coated over a substantially entire area of an outer peripheral surface of the exterior material in the circumferential and length directions. According to this configuration, the entire exterior material can be reinforced and reinforcing reliability can be enhanced. Further, masking or the like for defining a formation range of the reinforcing layer need not be applied to the outer peripheral surface of the exterior material and ease of manufacturing can be ensured.

A plurality of the wires may be inserted through the exterior material and the reinforcing layer may be coated individually on an outer peripheral surface of each of the wires. According to this configuration, the reinforcing layers are formed inside the exterior material. Thus, an outer diameter of the wiring harness does not increase and a concern about water intrusion between the reinforcing layer and the exterior material can be solved. Further, the reinforcing layers individually correspond to the respective wires. Thus, even if some wire(s) should become conductive with the exterior material made of metal along with the breakage of the reinforcing layer at the time of vehicle collision, the other wire(s) can be protected in an insulated state by the reinforcing layer.

The wires may be inserted through the exterior material and the reinforcing layer may be coated to cover outer peripheral surfaces of the wires collectively. According to this configuration, since the reinforcing layer is formed inside the exterior material, the outer diameter of the wiring harness does not increase and the concern about water intrusion between the reinforcing layer and the exterior material can be solved. Further, the reinforcing layer collectively covers the wires. Thus, for example, an operation of inserting the wires through the exterior material can be finished at one time.

A connector may be disposed at a position spaced from an end part of the exterior material. The wire may have an end area exposable on the connector side from the end part of the exterior material. A sheet material may be wound around the end area, and the reinforcing layer may be coated on the sheet material. According to this configuration, the end area of the wire is protected by the reinforcing layer via the sheet material. Further, since a grommet conventionally provided to correspond to the end area can be omitted, outer diameter enlargement and an increase of assembly man-hours can be suppressed. In addition, since the sheet material is wound around the end area and the reinforcing layer is coated on the sheet material, an operation of inserting the wire through the grommet in advance need not be performed and a workload can be reduced accordingly.

DETAILED DESCRIPTION

First Embodiment

Figure 1:
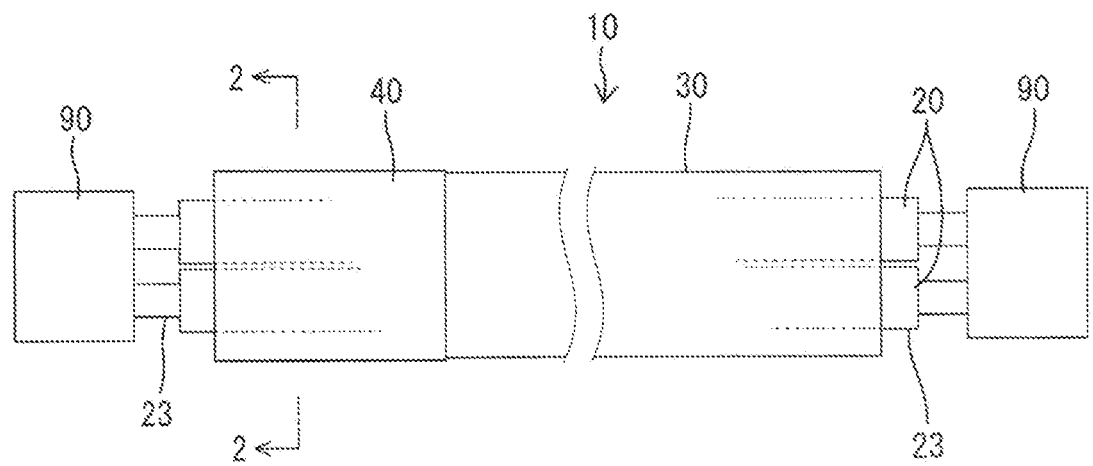
FIG. 1 is a side view of a wiring harness according to a first embodiment.
Figure 2:
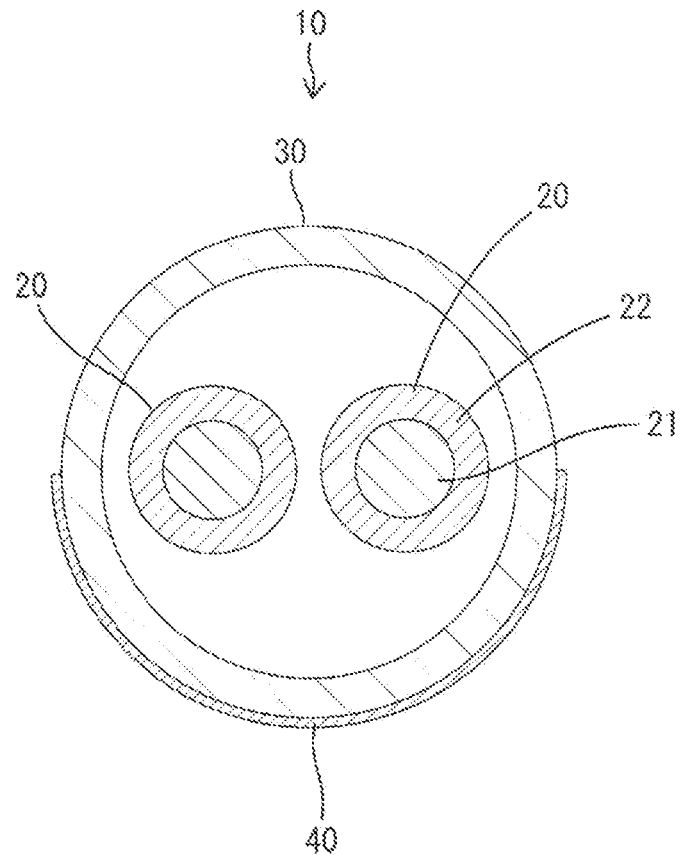
FIG. 2 is a section taken along line 2-2 of FIG. 1.

A first embodiment of the invention is described with reference to FIGS. 1 and 2. In the first embodiment, a wiring harness 10 is in an unillustrated hybrid vehicle, mainly routed under a floor of the vehicle to connect a device installed in an engine compartment in a front part of the vehicle and a device installed in a vehicle interior in a rear part of the vehicle.

The wiring harness 10 includes high-voltage wires 20 (two in this instance). As shown in FIG. 2, the wire 20 is a coated wire in which a conductor 21 is surrounded by an insulation coating 22. In the shown case, the wire 20 is a non-shielded wire having no shielding function. Both end parts of each wire 20 are held in connectors 90 provided on the devices in the front and rear parts of the vehicle via unillustrated terminal fittings.

The wiring harness 10 is installed under the floor of the vehicle and includes a pipe 30 serving as an exterior material through which the respective wires 20 are inserted. The pipe 30 is made of metal (aluminum, iron, stainless steel, copper or the like), has a hollow cylindrical shape and has a function of protecting the respective wires 20 accommodated inside from external matter and shielding electromagnetic waves. Although the illustrated pipe 30 is straight, the pipe 30 can be bent according to a routing path by a pipe bender or the like. The outer peripheral surface of the pipe 30 is colored with an identification color such as an orange color to indicate that the wires 20 are high-voltage wires. Note that, as shown in FIG. 1, both end sides of each wire 20 extend outward from both end parts of the pipe 30 and serve as end areas 23 to be introduced into the front and rear parts of the vehicle.

Further, the wiring harness 10 includes a reinforcing layer 40 covering the outer peripheral surface of the pipe 30. The reinforcing layer 40 is a resin film made of a resin material and is constituted by a coating (coating layer) of polyurea resin. The polyurea resin is a compound mainly composed of urea bonds formed by chemical reaction of isocyanate and amino groups, and excellent in impact resistance, water resistance, corrosion resistance and abrasion resistance. Further, the polyurea resin has a deformation following property, so that the pipe 30 can be bent after the reinforcing layer 40 is formed and the deformation of the pipe 30 at the time of vehicle collision can be followed.

The reinforcing layer 40 is formed in a short time by spraying the polyurea resin to the outer peripheral surface of the pipe 30 via a spray device such as a small gun to define a coating having a certain thickness. In this case, the reinforcing layer 40 may be laminated on a primer layer serving as an undercoat layer by coating the polyurea resin to improve adhesion. Further, the reinforcing layer 40 may be colored with an orange color or the like that is the same color as the outer peripheral surface of the pipe 30 to call attention to a high voltage.

The reinforcing layer 40 may be a coating of polyurethane resin instead of the polyurea resin. The polyurethane resin is a compound mainly composed of urethane bonds formed by chemical reaction of isocyanate and hydroxide groups or the like. Further, the reinforcing layer 40 may be a coating of hybrid resin obtained by mixing the polyurea resin and polyurethane resin or may partially contain resin other than the polyurea resin and the polyurethane resin or a component other than resin.

In the first embodiment, the reinforcing layer 40 is selectively formed in a location expected to be interfered with by external matter, such as a projection, at the time of vehicle collision. Specifically, the reinforcing layer 40 is coated on a part of the outer peripheral surface of the pipe 30 in circumferential and length directions. More specifically, the reinforcing layer 40 is coated on a lower circumferential part (angular range of about 180° in the circumferential direction) facing a road surface and a front part in a traveling direction of the vehicle with the pipe 30 installed under the floor.

In assembling, each wire 22 is inserted through the pipe 30 and the pipe 30 is disposed below and along the floor of the vehicle. In that state, due to a vehicle collision or the like, an impact force may be applied to a front area of the vehicle, a projection as an external matter may interfere with the reinforcing layer 40 formed on a front lower half circumferential side of the pipe 30 and a locally concentrated load may act on the reinforcing layer 40. However, the reinforcing layer 40 is constituted by the coating of the polyurea resin in the first embodiment. Thus, a crack in the pipe 30 can be prevented effectively and the damage of the pipe 30 can be suppressed satisfactorily. Particularly, since the reinforcing layer 40 is formed selectively in the location where an impact is expected to be applied in the first embodiment, the resin material such as the polyurea resin needs not be wastefully consumed.

Second Embodiment

Figure 3:
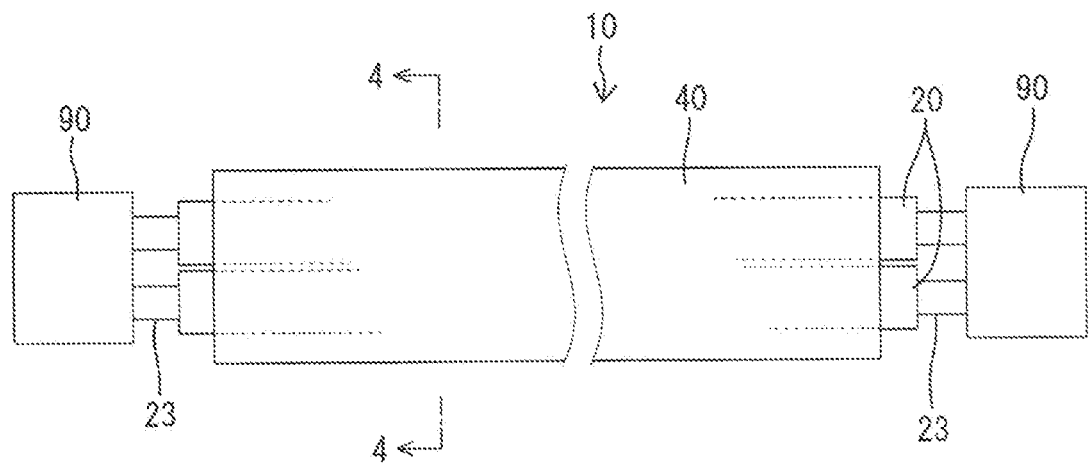
FIG. 3 is a side view of a wiring harness according to a second embodiment.
Figure 4:
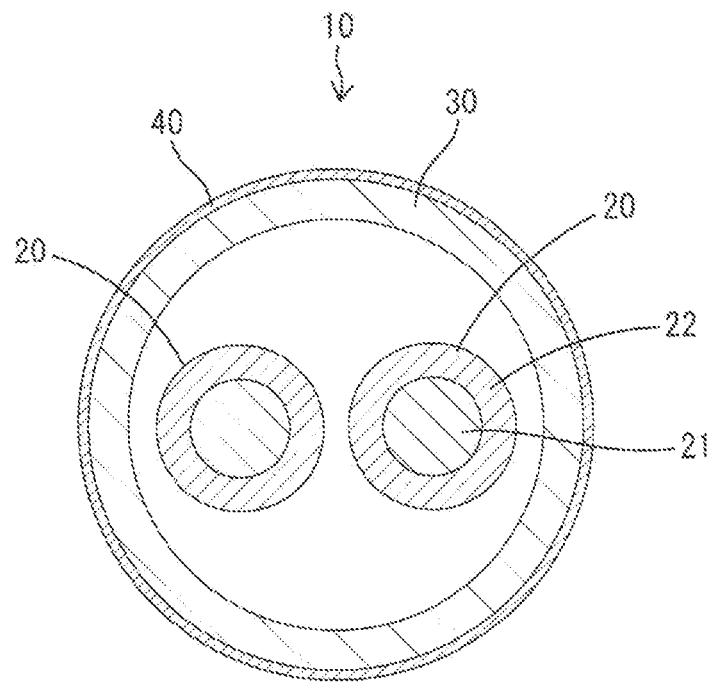
FIG. 4 is a section taken along line 4-4 of FIG. 3.

FIGS. 3 and 4 show a second embodiment of the invention. Note that, in the second embodiment, the same or equivalent (corresponding) components as those of the first embodiment are denoted by the same reference signs and repeated description is omitted. This point similarly applies to third to fifth embodiments to be described later.

The second embodiment is similar to the first embodiment in that a reinforcing layer 40 is coated on the outer peripheral surface of a pipe 30, but differs from the first embodiment in that a formation range of the reinforcing layer 40 extends over the entire area of the pipe 30 in circumferential and length directions. The reinforcing layer 40 is made of at least one material selected from polyurea resin, polyurethane resin or mixed resin of these as in the first embodiment. Since the reinforcing layer 40 is coated in the entire area of the outer peripheral surface of the pipe 30 in the case of the second embodiment, the reinforcing layer 40 can be formed easily using a spray device or the like.

Third Embodiment

Figure 5:
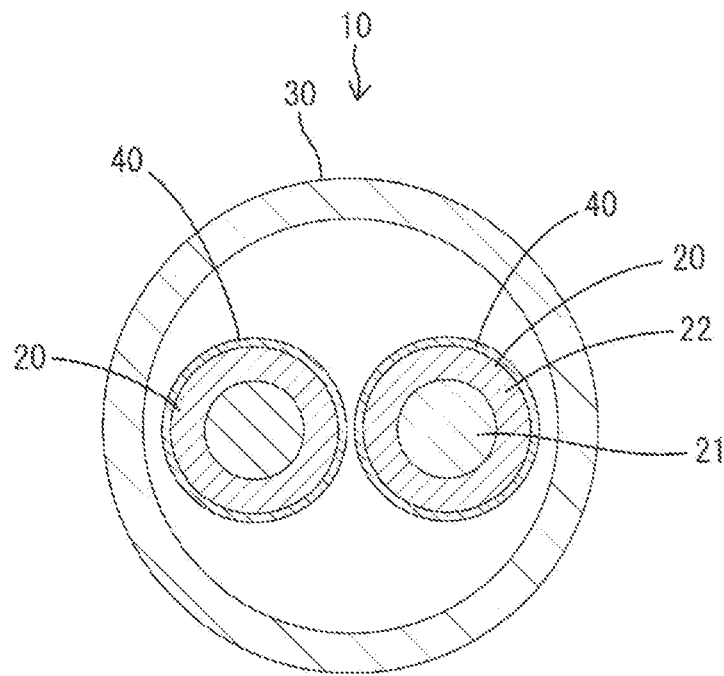
FIG. 5 is a section taken along line 5-5 of FIG. 7 and showing a wiring harness according to a third embodiment.

FIG. 5 shows a third embodiment of the invention. In the third embodiment, a reinforcing layer 40 is coated on the outer peripheral surface of each wire 20, but is not coated on a pipe 30. The reinforcing layer 40 is formed individually on each wire 20, and coated on the outer peripheral surface of an insulation coating 22 of each wire 22 by spraying a resin material such as polyurea resin to each wire 20 by a spray device. Although a formation range of the reinforcing layer 40 extends substantially over the entire area of each wire 20 in circumferential and length directions, but may extend over only a partial area.

In the third embodiment, even if an impact is applied to the pipe 30 at the time of vehicle collision and the pipe 30 is damaged, a conductive state of each wire 20 can be maintained satisfactorily since each wire 20 is protected by the reinforcing layer 40. Further, if the reinforcing layer 40 is made of a resin material good in deformation following property such as polyurea resin, each wire 20 can be bent according to a routing path after the reinforcing layer 40 is formed.

Since the reinforcing layers 40 are formed inside the pipe 30 according to the third embodiment, an outer diameter of a wiring harness 10 does not increase and a concern about water intrusion between the reinforcing layers 40 and the pipe 30 can be solved. Further, since the reinforcing layers 40 are formed individually on the respective wires 20 in the case of the third embodiment, even if the reinforcing layer 40 corresponding to one wire 20 should be destroyed at the time of vehicle collision, a conductive state of the other wire 20 can be maintained as long as the reinforcing layer 40 corresponding to the other wire 20 is present without being damaged.

Fourth Embodiment

Figure 6:
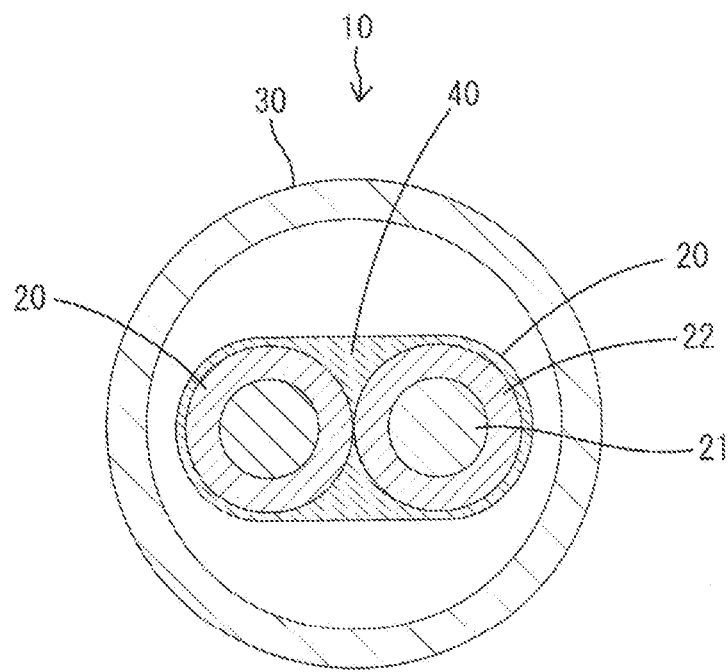
FIG. 6 is a section similar to FIG. 5 but showing a fourth embodiment.

FIG. 6 shows a fourth embodiment of the invention. The fourth embodiment is similar to the third embodiment in that a reinforcing layer 40 is a resin film of polyurea resin or the like and coated on the outer peripheral surfaces of the respective wires 20. The reinforcing layer 40 differs from those of the third embodiment in that the reinforcing layer 40 collectively covers the wires 20. Specifically, the reinforcing layer 40 is coated over a range extending around the wires 20 adjacent to each other and has an oval or elliptical cross-sectional shape as a whole.

According to the fourth embodiment, since the reinforcing layer 40 is formed inside a pipe 30 as in the third embodiment, an outer diameter of a wiring harness 10 does not increase and a concern about water intrusion between the reinforcing layer 40 and the pipe 30 can be solved. Further, since the wires 20 can be handled integrally via the reinforcing layer 40 in the case of the fourth embodiment, the respective wires 20 can be inserted through the pipe 30 at one time and an inserting operation of the respective wires 20 can be performed easily.

Fifth Embodiment

Figure 7:
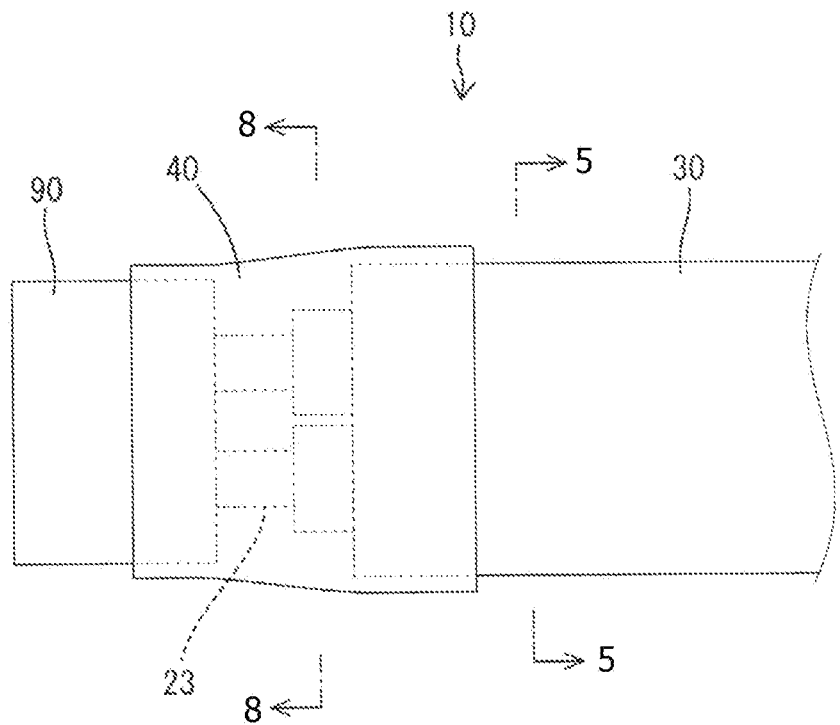
FIG. 7 is a partial enlarged side view of a wiring harness according to a fifth embodiment.
Figure 8:
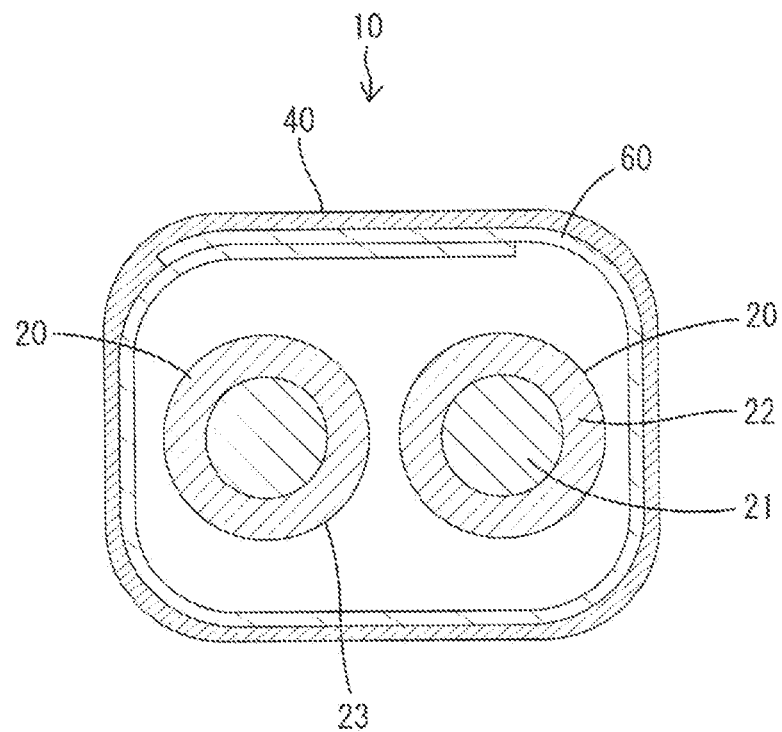
FIG. 8 is a section taken along line 8-8 of FIG. 7.

FIGS. 7 and 8 show a fifth embodiment of the invention. In the fifth embodiment, a reinforcing layer 40 is formed to cover end areas 23 of respective wires 20. The fifth embodiment differs from the first to fourth embodiments in this point. Note that the end areas 23 are areas routed to be exposable between an end part of a pipe 30 and a connector 90 on end sides of the wires 20.

In the first to fourth embodiments, the end areas 23 of the respective wires 20 normally are covered by an unillustrated rubber grommet. However, the end areas 23 of the respective wires 20 in the fifth embodiment are covered collectively by a sheet material 60 instead of a grommet. The sheet material 60 is made of a resin material having a high flexibility such as PVC (polyvinyl chloride) and may be a film.

This sheet material 60 is fixed over the end part of the pipe 30 and the connector 90 while being wound around the end areas 23 of the respective wires 20. The reinforcing layer 40 is coated on a surface of the sheet material 60 by spraying a resin material such as polyurea resin by a spray device, and covers around the respective wires 20 indirectly via the sheet material 60. A formation range of the reinforcing layer 40 preferably extends over the entire surface of the sheet material 60, but may extend over only a partial area.

Since a grommet need not be mounted around the end areas 23 of the respective wires 20 according to the fifth embodiment, outer diameter enlargement and an increase of assembly man-hours can be suppressed. Moreover, it is not necessary to insert the respective wires 20 through the grommet in advance so that a workload can be reduced.

Other Embodiments

The invention is not limited to the above described and illustrated first to fifth embodiments. For example, the following embodiments also are included in the scope of the invention.

The exterior material may be a tube such as a corrugated tube or shrink tube and the reinforcing layer may be coated on a peripheral surface of the tube.

The reinforcing layer may be formed on the inner peripheral surface of the exterior material such as a pipe.

The reinforcing layers may be formed on both the wires and the exterior material such as a pipe.

The pipe may be made of resin or may be a composite pipe in which resin and metal are laminated.

The wires may be shielded wires individually having a shielding function.

The number of the wires inserted through the exterior material such as a pipe is not limited. One, three or more wires may be inserted.

The wiring harness may be applied to an electric vehicle or general automotive vehicle without being limited to the hybrid vehicle and a location where the wiring harness is applied is also not limited.

List of Reference Signs

10 wiring harness
20 wire
23 end area
30 pipe (exterior material)
40 reinforcing layer
60 sheet material
90 connector

The invention claimed is:

1. A wiring harness, comprising:
   at least one wire;
   an exterior material through which the at least one wire is inserted;
   a connector disposed away from an end part of the exterior material;
   an end area of the at least one wire extending beyond the end part of the exterior material;
   a sheet material wound to cover the end area of the at least one wire, an area of the exterior material adjacent the end area of the at least one wire and, an area of the connector adjacent the end area of the at least one wire; and
   a reinforcing layer continuously coated over an entire periphery of a surface of the sheet material, the reinforcing layer being formed from a reinforcing material containing polyurea resin.

2. The wiring harness of claim 1, wherein the reinforcing layer is coated on a part of an outer peripheral surface of the exterior material in a circumferential direction and a length direction.

3. The wiring harness of claim 1, wherein the reinforcing layer is coated over a substantially entire area of an outer peripheral surface of the exterior material in a circumferential direction and a length direction.

4. The wiring harness of claim 1, wherein the at least one wire comprises plural wires inserted through the exterior material and the wiring harness further has the reinforcing material coated individually on an outer peripheral surface of each of the plural wires.

5. The wiring harness of claim 1, wherein the at least one wire comprises plural wires inserted through the exterior material and the wiring harness further has the reinforcing material coated to collectively cover outer peripheral surfaces of the plural wires.

6. The wiring harness of claim 1, wherein the exterior material is a pipe that circumferentially surrounds the at least one wire.

7. The wiring harness of claim 6, wherein the pipe is made of metal.

8. The wiring harness of claim 1, wherein the exterior material is of a specified color, and wherein the reinforcing layer is of a color identical to the color of the exterior material.

\* \* \* \* \*